(12) United States Patent
Lethellier

(10) Patent No.: US 6,441,597 B1
(45) Date of Patent: Aug. 27, 2002

(54) METHOD AND APPARATUS FOR SENSING OUTPUT INDUCTOR CURRENT IN A DC-TO-DC POWER CONVERTER

(75) Inventor: Patrice R. Lethellier, Oxnard, CA (US)

(73) Assignee: Semtech Corporation, Camarillo, CA (US)

(*) Notice: Subject to any disclaimer, the term of this patent is extended or adjusted under 35 U.S.C. 154(b) by 0 days.

(21) Appl. No.: 10/001,722

(22) Filed: Oct. 31, 2001

(51) Int. Cl.[7] ............................. G05F 1/40; G05F 1/44
(52) U.S. Cl. ..................... 323/282; 323/284; 323/222
(58) Field of Search ................................ 323/282, 284, 323/222, 226, 286

(56) References Cited

U.S. PATENT DOCUMENTS

| | | | |
|---|---|---|---|
| 5,920,475 A | * 7/1999 | Boylan et al. | 363/127 |
| 5,982,136 A | 11/1999 | Pelly | 363/35 |
| 5,982,160 A | * 11/1999 | Walters et al. | 323/282 |
| 6,094,038 A | 7/2000 | Lethellier | 322/282 |
| 6,127,814 A | * 10/2000 | Goder | 323/282 |
| 6,160,388 A | 12/2000 | Skelton et al. | 323/282 |
| 6,166,528 A | 12/2000 | Rossetti et al. | 323/283 |
| 6,219,262 B1 | 4/2001 | Burgyan | 363/97 |
| 6,229,289 B1 | * 5/2001 | Piovaccari et al. | 323/268 |
| 6,246,220 B1 | 6/2001 | Isham et al. | 323/224 |
| 6,304,066 B1 | * 10/2001 | Wilcox et al. | 323/282 |

* cited by examiner

Primary Examiner—Bao Q. Vu
(74) Attorney, Agent, or Firm—O'Melveny & Myers LLP

(57) ABSTRACT

A current sense circuit for a DC-to-DC power converter accurately senses the output inductor current without adversely affecting efficiency of the power converter. The current sense circuit produces a current sense signal having amplitude sufficiently above the noise floor so that accurate load control of the power converter is achieved. Specifically, the DC-to-DC power converter includes at least one power switch connected to an input voltage source. At least one phase sensing switch is connected to the input voltage source in parallel with the at least one power switch. A pulse width modulation circuit provides common control pulses for the at least one power switch and the at least one phase sensing switch responsive to a current sense signal. An output inductor is connected to the at least one power switch and to a load. A current sensor is coupled to the output inductor and providing the current sense signal to the pulse width modulation circuit corresponding to current passing through an internal DC resistance of the output inductor. The current sensor further includes a filter that includes an on-state resistance of the at least one power switch. The current sensor further includes a second filter adapted to remove noise from the current sense signal when the at least one phase sensing switch and the at least one power switch change state.

20 Claims, 3 Drawing Sheets

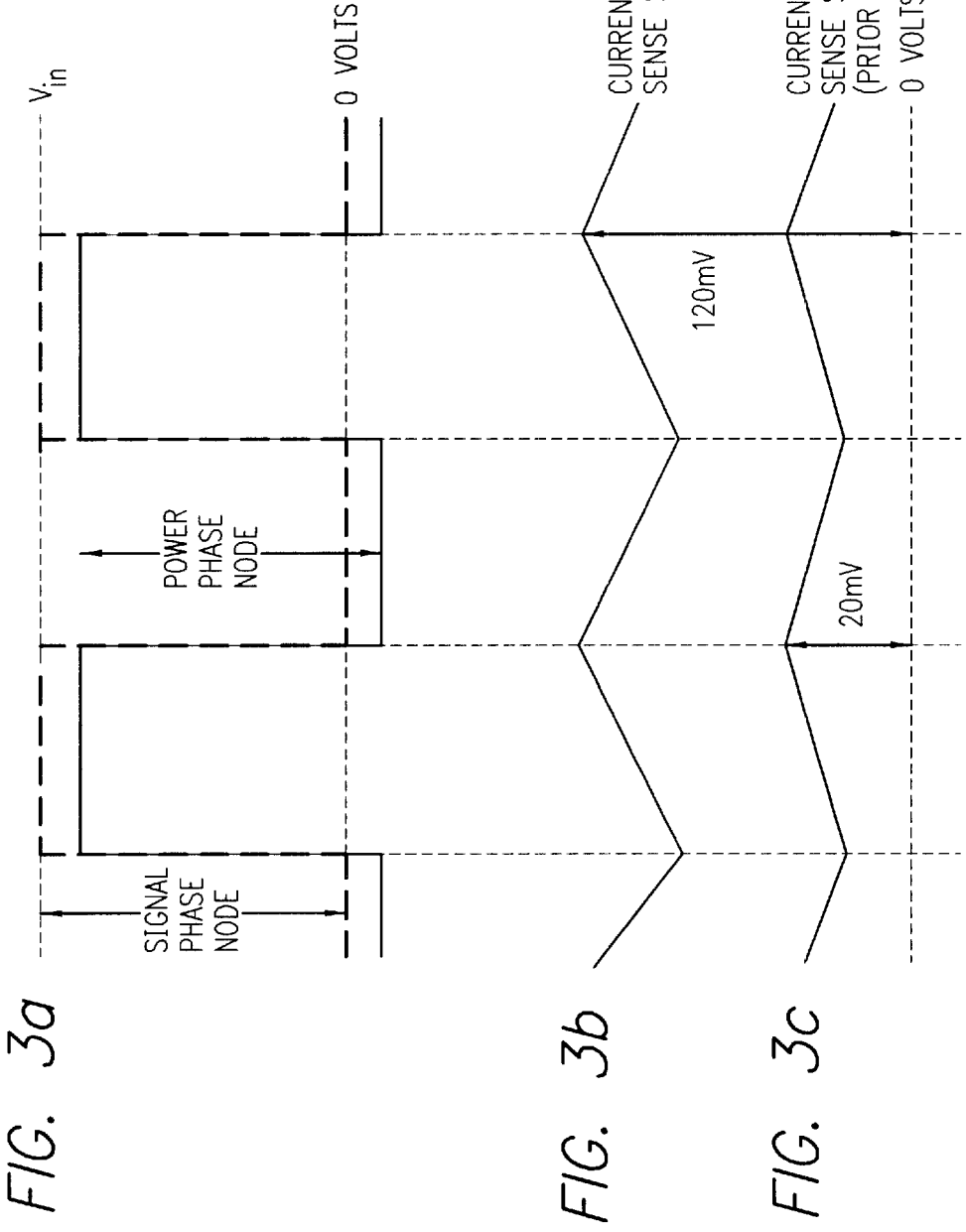

METHOD AND APPARATUS FOR SENSING OUTPUT INDUCTOR CURRENT IN A DC-TO-DC POWER CONVERTER

BACKGROUND OF THE INVENTION

1. Field of the Invention

The present invention relates to voltage regulator circuits. More particularly, the invention relates to the sensing of output inductor current delivered to a load by a buck-type DC-to-DC switched mode power converter.

2. Description of Related Art

Switched mode DC-to-DC power converters are commonly used in the electronics industry to convert an available direct current (DC) level voltage to another DC level voltage. A switched mode converter provides a regulated DC output voltage by selectively storing energy by switching the flow of current into an output inductor coupled to a load. A synchronous buck converter is a particular type of switched mode converter that uses two power switches, such as MOSFET transistors, to control the flow of current in the output inductor. A high-side switch selectively couples the inductor to a positive power supply while a low-side switch selectively couples the inductor to ground. A pulse width modulation (PWM) control circuit is used to control the gating of the high-side and low-side switches in an alternating manner. Synchronous buck converters generally offer high efficiency and high power density, particularly when MOSFET devices are used due to their relatively low on-resistance. Therefore, synchronous buck converters are advantageous for use in providing power to electronic systems having demanding power requirements, such as microprocessors that require a control voltage ($V_{cc}$) of 1 to 1.5 volts with current ranging from 40 to 60 amps. For certain applications having especially high current load requirements, it is known to combine plural synchronous buck converters together in multi-phase configurations operated in an interleaf mode.

To regulate the performance of a synchronous buck converter, it is known to monitor the amount of current sent to the load. This information is important to protect the load from damage caused by excessive current, to ensure that sufficient current is delivered to the load in view of changing load conditions (i.e., controlling voltage "droop" caused by a step load), and to permit current sharing between phases of multi-phase configurations. One approach to measuring the load current is to include a sensing resistor in series with the output inductor and to monitor the voltage drop across the sensing resistor. The sensing resistor must have a resistance value large enough to keep the sensed voltage signal above the noise floor, as the voltage drop can be measured more accurately with a higher resistance value. A significant drawback of this approach is that the sensing resistor wastes the output energy and thereby reduces the efficiency of the synchronous buck converter. Moreover, the sensing resistor generates heat that must be removed from the system.

Another approach to measuring the load current is to place the sensing resistor in series with the drain of the high-side switch (i.e., MOSFET) and monitor the voltage drop across the sensing resistor as in the preceding approach. In this position, the amount of energy dissipated by the sensing resistor is substantially less than in the aforementioned position in series with the output inductor. A drawback of this approach is that the high-side switch changes state at a relatively high rate (e.g., greater than 250 KHz) and, as a result, the high-side switch current is discontinuous. When the high-side switch turns on, the current through the switch and the sensing resistor starts at zero and increases rapidly before settling and then returning to zero when the high-side switch turns off. The information obtained from sampling the voltage across the sensing resistor must therefore be utilized during a subsequent switching cycle, making it necessary to include "sample and hold" circuitry to store the sampled information from cycle to cycle. Not only does this add complexity to the converter, but there is also a time delay in regulating the output current that diminishes the stability of the converter.

Yet another approach to measuring the load current is to include a filter in parallel with the output inductor. The filter includes a resistor and a capacitor connected together in series. The signal passing through the output inductor has a DC component and an AC component. The AC component of the signal depends on the inductance and internal resistance values of the output inductor, as well as the resistance and capacitance of the current sensor. Through proper selection of the values of the resistor and capacitor, the instantaneous voltage across the capacitor can be made equal to the voltage across the DC resistance of the inductor and thereby proportional to the instantaneous current through the output inductor. Thus, the output inductor current can be sensed without dissipating the output energy by monitoring the voltage across the capacitor. A drawback of this approach is that the current sense signal has relatively small amplitude that is close to the noise floor and therefore highly susceptible to distortion due to noise.

It is also known to use the on-state resistance ($R_{DSON}$) between source and drain terminals of one of the MOSFET switches as a sensing resistor. The advantage of this method is that there is no additional loss in energy by using the $R_{DSON}$ as the sensing resistor since this energy loss is already an inherent part of converter operation. Unfortunately, this method suffers from the same drawbacks as the aforementioned method of placing the sensing resistor in series with the drain of the high-side switch.

Accordingly, it would be desirable to provide a way to accurately sense the output inductor current delivered to a load by a buck-type DC-to-DC switched mode power converter without adversely affecting efficiency of the power converter.

SUMMARY OF THE INVENTION

The present invention overcomes these drawbacks of the prior art by providing a current sense circuit for a DC-to-DC power converter that accurately senses the output inductor current without adversely affecting efficiency of the power converter. The current sense circuit produces a current sense signal having amplitude sufficiently above the noise floor so that accurate load control of the power converter is achieved.

In an embodiment of the invention, the DC-to-DC power converter includes at least one power switch connected to an input voltage source. At least one phase sensing switch is connected to the input voltage source in parallel with the at least one power switch. A pulse width modulation circuit provides common control pulses for the at least one power switch and the at least one phase sensing switch responsive to a current sense signal. An output inductor is connected to the at least one power switch and to a load. A current sensor is coupled to the output inductor and providing the current sense signal to the pulse width modulation circuit corresponding to current passing through an internal DC resistance of the output inductor. The current sensor further includes a filter that includes an on-state resistance of the at least one power switch. The current sensor further includes a second filter adapted to remove noise from the current sense signal when the at least one phase sensing switch and the at least one power switch change state.

More particularly, the at least one power switch further comprises a high-side power switch connected to the power input and a low-side power switch connected to ground. The high-side power switch and the low-side power switch are connected together to define a power phase node therebetween. The output inductor is connected to the power phase node. The at least one phase sensing switch further comprises a high-side phase sensing switch connected to the power input and a low-side phase sensing switch connected to ground. The high-side phase sensing switch and the low-side phase sensing switch are connected together to define a signal phase node therebetween. The filter is connected to the signal phase node. The filter further comprises an on-state resistance of the high-side power switch and the high-side phase sensing switch during a conductive state of the high-side switches, and comprises an on-state resistance of the low-side power switch and the low-side phase sensing switch during a conductive state of the low-side switches. In view of the increased resistance of the current sensor, the voltage of the current sense signal will be increased accordingly, thereby providing a cleaner signal referenced to the output current that is less susceptible to noise than the signal produced by the prior art current sense circuit.

In another embodiment of the invention, a method for sensing output inductor current in a DC-to-DC power converter is provided. The power converter comprises at least one power switch connected to an input voltage source, at least one phase sensing switch connected to the input voltage source in parallel with the at least one power switch, a pulse width modulation circuit for generating common control pulses for the at least one power switch and the at least one phase sensing switch, and an output inductor connected to the at least one power switch and to a load. The method for sensing output current comprises sensing output current passing through the output inductor using a current sensor connected to the output inductor and to the at least one phase sensing switch. The current sensor comprises a capacitor and a resistance that includes at least an on-state resistance of the at least one power switch. The method next comprises generating a current sense signal corresponding to the output current, and operating the pulse width modulation circuit to control the at least one power switch responsive to the current sense signal. The method further comprises filtering noise from the current sense signal when the at least one phase sensing switch and the at least one power switch change state.

In yet another embodiment of the invention, a control circuit for use with a DC-to-DC power converter is provided. The power converter includes at least one power switch connected to an input voltage source, an output inductor connected to the at least one power switch and to a load, and a current sensor connected to the output inductor. The control circuit comprises at least one phase sensing switch connected to the input voltage source in parallel with the at least one power switch, and a pulse width modulation circuit for generating common control pulses for the at least one power switch and the at least one phase sensing switch responsive to a current sense signal provided by the current sensor. The current sensor is further connected to the at least one phase sensing switch, and comprises a capacitor and a resistance that includes at least an on-state resistance of the at least one power switch. The current sensor further comprises a differential amplifier adapted to measure a voltage across the capacitor.

More particularly, the at least one power switch further comprises a high-side power switch connected to the power input and a low-side power switch connected to ground. The high-side power switch and the low-side power switch are further connected together to define an power phase node therebetween. The output inductor is connected to the power phase node. The at least one phase sensing switch further comprises a high-side phase sensing switch connected to the power input and a low-side phase sensing switch connected to ground. The high-side phase sensing switch and the low-side phase sensing switch are further connected together to define a singal phase node therebetween. The current sensor is connected to the signal phase node.

A more complete understanding of the method and apparatus for sensing output inductor current in a DC-to-DC power converter will be afforded to those skilled in the art, as well as a realization of additional advantages and objects thereof, by a consideration of the following detailed description of the preferred embodiment. Reference will be made to the appended sheets of drawings that will first be described briefly.

BRIEF DESCRIPTION OF THE DRAWINGS

FIG. 3a is a graph illustrating the voltages across the low-side power and phase sensing switches of the DC-to-DC power converter of FIG. 2;

FIG. 3b is a graph illustrating the current sense signal provided by the inductor current sense circuit of FIG. 2; and FIG. 3c is a graph illustrating the current sense signal provided by the prior art inductor current sense circuit of FIG. 1.

DETAILED DESCRIPTION OF THE PREFERRED EMBODIMENT

The present invention satisfies the need for a way to sense the inductor output current delivered to a load by a buck-type DC-to-DC switched mode power converter. In the detailed description that follows, like element numerals are used to describe like elements illustrated in one or more of the drawings.

Figure 1:
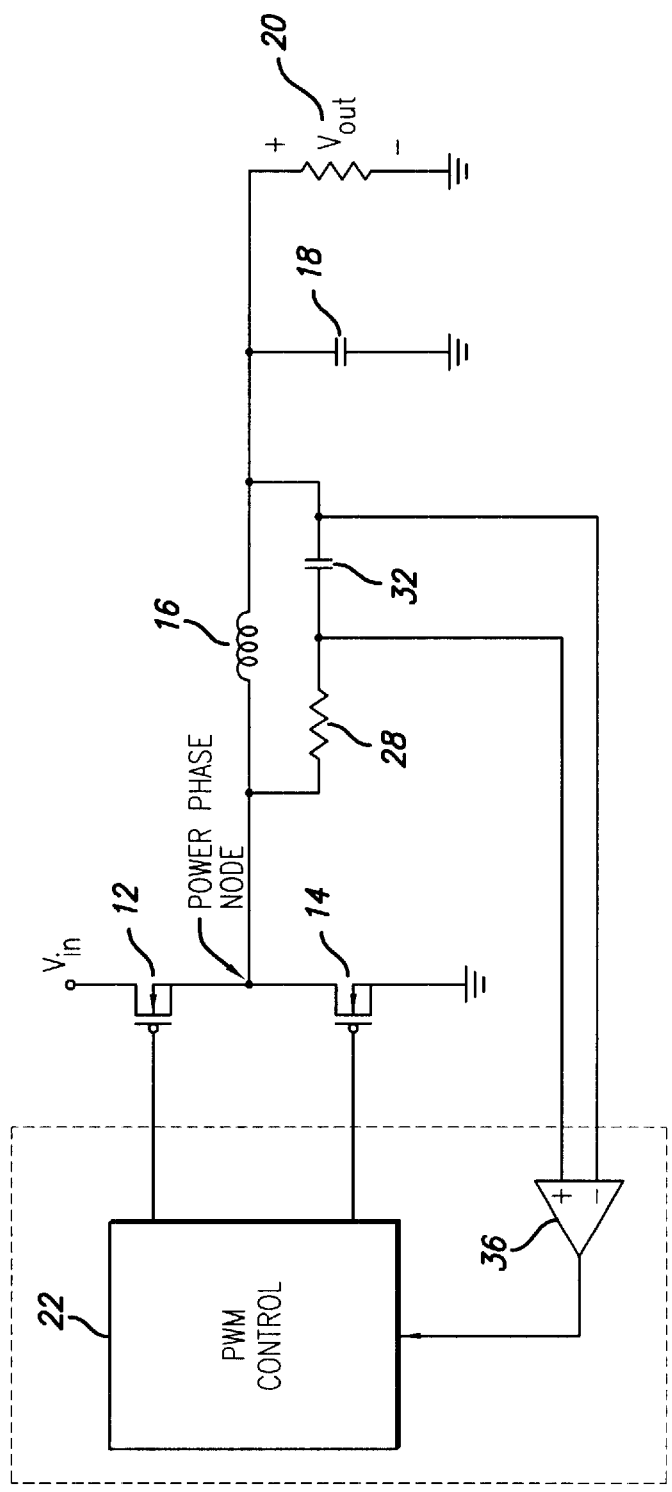
FIG. 1 is a schematic diagram of a DC-to-DC power converter having an output inductor current sense circuit in accordance with the prior art.

Referring first to FIG. 1, a prior art DC-to-DC power converter utilizing conventional inductor current sensing is illustrated. The DC-to-DC power converter provides an output voltage ($V_{OUT}$) to a load 20, schematically represented as a resistor. The power converter further includes a high-side power switch 12 and a low-side power switch 14 connected to an input voltage source ($V_{IN}$). The high-side power switch 12 and the low-side power switch 14 are generally provided by MOSFET devices, with the drain of high-side power switch 12 electrically connected to the input voltage source $V_{IN}$, the source of the high-side power switch 12 electrically connected to the drain of the low-side power switch 14, and the source of the low-side power switch 14 electrically connected to ground. A power phase node is defined between the source of the high-side power switch 12 and the drain of the low-side power switch 14. An output inductor 16 is connected in series between the power phase node and the load 20. A capacitor 18 is electrically connected in parallel with the load 12 to provide smoothing of the output voltage $V_{OUT}$. A pulse width modulation (PWM) control circuit 22 is connected to the gates of both the high-side power switch 12 and low-side power switch 14, and generates a series of pulse width modulated control pulses for the power switches 12, 14 to regulate the output voltage $V_{OUT}$ coupled to the load 12. The PWM control circuit 22 provides a signal to turn on the power switches 12, 14 in an alternating manner. The PWM control circuit 22 regulates the current through the output inductor 16 by controlling the timing and duration of conduction of the power switches 12, 14.

A current sense circuit for the power converter includes a filter electrically connected in parallel with the output inductor 16. The filter further comprises resistor 28 and capacitor 32 electrically connected together in series. As known in the art, the voltage across the capacitor 32 corresponds to the voltage across the DC resistance of the output inductor 16. The voltage across the capacitor 32 is measured using a differential amplifier 36 that has inputs connected to either end of the capacitor. The output of the differential amplifier 36 provides a current sense signal to the PWM control circuit 22. The current sense signal of the prior art current sense circuit is illustrated graphically in FIG. 3c. It should be appreciated that the PWM control circuit 22 and differential amplifier 36 are shown in FIG. 1 as included within a phantom box since these components are generally combined within an integrated circuit used to control operation of the DC-to-DC power converter. The PWM control circuit 22 may also be adapted to receive other input signals used to control the timing and duration of the gating signals provided to the high-side power switch 12 and low-side power switch 14, such as an output voltage sense signal or a current share signal from other power converters of a multiphase power converter. These additional signals are otherwise omitted from this description as not pertinent to the invention.

Figure 2:
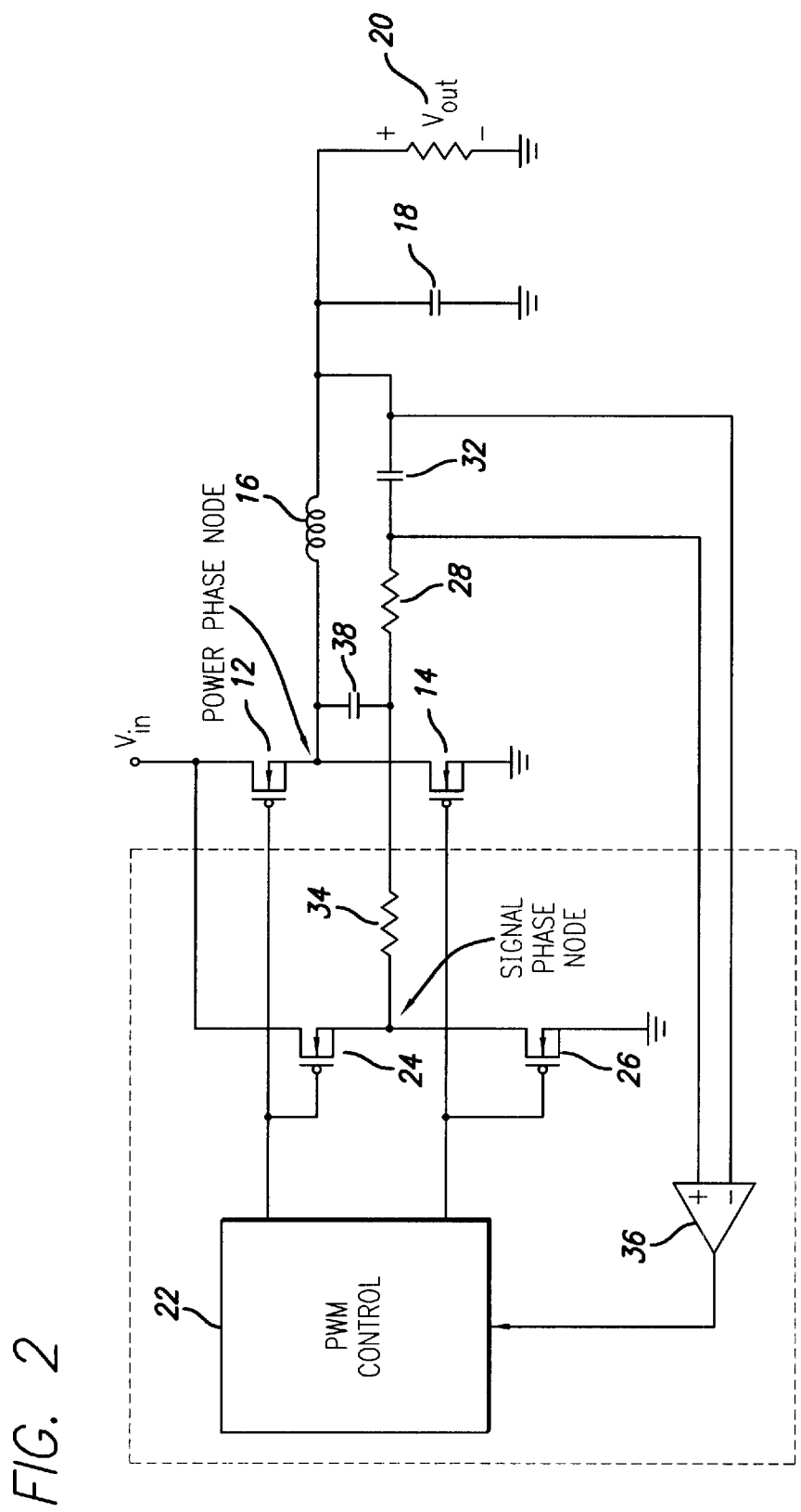
FIG. 2 is a schematic diagram of a DC-to-DC power converter having an inductor current sense circuit in accordance with the present invention.

Referring now to FIG. 2, a DC-to-DC power converter in accordance with the invention is illustrated. The power converter includes a high-side phase sensing switch 24 and a low-side phase sensing switch 26. The phase sensing switches 24, 26 are connected in parallel with the power switches 12,14, and are provided by relatively low-power MOSFET devices. Specifically, the drain of high-side phase sensing switch 24 is electrically connected to the input voltage source $V_{IN}$, the source of the switch 24 is as electrically connected to the drain of the low-side phase sensing switch 26, and the source of the switch 26 is electrically connected to ground. The gates of phase sensing switches 24, 26 are electrically connected to the PWM control circuit 22 in common with A the gates of the power switches 12, 14, respectively. A signal phase node is defined between the source of the high-side phase sensing switch 24 and the drain of the low-side phase sensing switch 26. The PWM control circuit 22, differential amplifier 36, and phase sensing switches 24, 26 are shown in FIG. 2 as included within a phantom box since these components may be combined within an integrated circuit used to control operation of the DC-to-DC power converter.

A current sense circuit for the power converter includes a filter comprising resistor 28 and capacitor 32 as in the conventional circuit, though the filter is not directly connected in parallel with the inductor as in the conventional circuit. Instead, the filter further includes resistor 34 and capacitor 38. Resistor 34 is connected in series with resistor 28, and is electrically connected to the signal phase node between the source of the high-side phase sensing switch 24 and the drain of the low-side phase sensing switch 26. Capacitor 38 is connected to the power phase node between the source of the high-side power switch 12 and the drain of the low-side power switch 14, and the junction of resistors 34 and 28. The filter also includes the on-state resistance $R_{DSON}$ Of the phase sensing switches 24, 26 and power switches 12, 14. As before, the voltage across the capacitor 32 is measured using a differential amplifier 36 that has inputs connected to either end of the capacitor. The output of the differential amplifier 36 provides a current sense signal to the PWM control circuit 22. The current sense signal of the current sense circuit of the present invention is illustrated graphically in FIG. 3b.

More particularly, when the high-side power switch 12 and high-side phase sensing switch 24 are activated, and the low-side power switch 14 and low-side phase sensing switch 26 are turned off, the resistance of the filter includes the on-state resistance $R_{DSON}$ of the high-side power switch 12 and the high-side phase sensing switch 24. Similarly, when the low-side power switch 14 and low-side phase sensing switch 26 are activated, and the high-side power switch 12 and high-side phase sensing switch 24 are turned off, the resistance of the filter includes the on-state resistance $R_{DSON}$ of the low-side power switch 14 and the low-side phase sensing switch 26. The current sense signal is therefore continuous throughout the power cycle. During transitions of the power converter between an on-state of the high-side switches to on-state of the low-side switches, and vice versa, all of the switches are temporarily in an off state. The capacitor 38 and resistor 34 are operative during this dead time of the power cycle to provide a low-pass filter to block any high frequency transient signals from affecting the current sense signal and synchronize operation of the power phase node and signal phase node.

FIG. 3a illustrates the voltages at the power phase node (i.e., across the low-side power switch 14) and at the signal phase node (i.e., across the low-side phase sensing switch 26) of the DC-to-DC power converter. When the high-side power switch 12 is activated, the voltage at the power phase node is just below the input voltage $V_{IN}$ due to the voltage drop across the MOSFET device. Similarly, when the low-side power switch 14 is activated, the voltage at the power phase node goes slightly negative (i.e., below ground) due to the voltage drop across the MOSFET device. In contrast, the voltage at the signal phase node remains close to rail-to-rail levels, i.e., when the high-side phase sensing switch 24 is activated, the voltage at the signal phase node is substantially equal to the input voltage $V_{IN}$, and when the low-side phase sensing switch 26 is activated, the voltage at the signal phase node is substantially equal to ground. This is because the phase sensing switches 24, 26 conduct very low current, and there is thus negligible voltage drop across the devices. As a result, any power loss of the power converter caused by the addition of the two MOSFET devices is insignificant. Regardless, the presence of the capacitor 38 and resistor 34 extending between the power phase node and the signal phase node tends to average the voltage difference and thereby eliminate any adverse affect on the current sense signal.

In view of the increased resistance of the current sense circuit, the voltage of the current sense signal will be increased accordingly, thereby providing a cleaner signal referenced to the output current that is less susceptible to noise than the signal produced by the prior art current sense circuit. In an embodiment of the invention, the on-state resistance $R_{DSON}$ of the low-side phase sensing switch 26 and low-side power switch 14 add roughly 5 to 10 mΩ of resistance to the 1 to 2 mΩ DC resistance of the output inductor 16. This results in an increase in voltage of the current sense signal to roughly 120 mV at peak from 20 mV at peak for the conventional current sensor, or a six-fold increase in the amplitude of the current sense signal.

Having thus described a preferred embodiment of a method and apparatus for sensing output inductor current in a DC-to-DC power converter, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A DC-to-DC power converter, comprising:
   at least one power switch connected to an input voltage source;
   at least one phase sensing switch connected to said input voltage source in parallel with said at least one power switch;
   a pulse width modulation circuit for generating common control pulses for said at least one power switch and said at least one phase sensing switch responsive to a current sense signal;
   an output inductor connected to said at least one power switch and to a load;
   a current sensor coupled to said output inductor and providing said current sense signal corresponding to current passing through an internal DC resistance of said output inductor, said current sensor further including a first filter that includes an on-state resistance of said at least one power switch.

2. The DC-to-DC converter of claim 1, wherein said first filter further comprises a resistor and a capacitor connected together in series.

3. The DC-to-DC converter of claim 2, wherein said current sensor further comprises a differential amplifier adapted to measure a voltage across said capacitor.

4. The DC-to-DC converter of claim 1, wherein said current sensor further comprises a second filter adapted to remove noise from said current sense signal when said at least one phase sensing switch and said at least one power switch change state.

5. The DC-to-DC converter of claim 1, wherein said at least one power switch further comprises a MOSFET device.

6. The DC-to-DC converter of claim 1, wherein said at least one power switch further comprises a high-side power switch connected to said power input and a low-side power switch connected to ground, said high-side power switch and said low-side power switch further being connected together defining an power phase node therebetween, said output inductor being connected to said power phase node.

7. The DC-to-DC converter of claim 6, wherein said at least one phase sensing switch further comprises a high-side phase sensing switch connected to said power input and a low-side phase sensing switch connected to ground, said high-side phase sensing switch and said low-side phase sensing switch further being connected together defining a signal phase node therebetween, said first filter being connected to said signal phase node.

8. The DC-to-DC converter of claim 7, wherein said current sensor further comprises a second filter coupled between said power phase node and said signal phase node to remove noise from said current sense signal when said at least one phase sensing switch and said at least one power switch change state.

9. The DC-to-DC converter of claim 7, wherein said first filter further comprises an on-state resistance of said high-side power switch and said high-side phase sensing switch during a conductive state of said high-side switches, and comprises an on-state resistance of said low-side power switch and said low-side phase sensing switch during a conductive state of said low-side switches.

10. The DC-to-DC converter of claim 1, wherein said at least one phase sensing switch and said pulse width modulation circuit are included in a common integrated circuit.

11. In a DC-to-DC power converter comprising at least one power switch connected to an input voltage source, at least one phase sensing switch connected to said input voltage source in parallel with said at least one power switch, a pulse width modulation circuit for generating common control pulses for said at least one power switch and said at least one phase sensing switch, and an output inductor connected to said at least one power switch and to a load, a method for sensing output current comprises the steps of:
   sensing output current passing through said output inductor using a current sensor connected to said output inductor and to said at least one phase sensing switch, the current sensor comprising a capacitor and a resistance that includes at least an on-state resistance of said at least one power switch;
   generating a current sense signal corresponding to said output current; and
   operating said pulse width modulation circuit to control the at least one power switch responsive to said current sense signal.

12. The method of claim 11, wherein said generating step further comprising measuring a voltage differential across said capacitor.

13. The method of claim 11, further comprising filtering noise from said current sense signal when said at least one phase sensing switch and said at least one power switch change state.

14. A control circuit for use with a DC-to-DC power converter comprising at least one power switch connected to an input voltage source, an output inductor connected to said at least one power switch and to a load, and a current sensor connected to said output inductor, the control circuit comprising:
   at least one phase sensing switch connected to said input voltage source in parallel with said at least one power switch;
   a pulse width modulation circuit for generating common control pulses for said at least one power switch and said at least one phase sensing switch responsive to a current sense signal provided by said current sensor;
   wherein, said current sensor is further connected to said at least one phase sensing switch, the current sensor comprising a capacitor and a resistance that includes at least an on-state resistance of said at least one power switch.

15. The control circuit of claim 14, wherein said current sensor further comprises a differential amplifier adapted to measure a voltage across said capacitor.

16. The control circuit of claim 14, wherein said at least one power switch further comprises a high-side power switch connected to said power input and a low-side power switch connected to ground, said high-side power switch and said low-side power switch further being connected together defining an power phase node therebetween, said output inductor being connected to said power phase node.

17. The control circuit of claim 16, wherein said at least one phase sensing switch further comprises a high-side phase sensing switch connected to said power input and a low-side phase sensing switch connected to ground, said high-side phase sensing switch and said low-side phase sensing switch further being connected together defining a signal phase node therebetween, said current sensor being connected to said signal phase node.

18. The control circuit of claim 17, wherein said current sensor further comprises a filter coupled between said power phase node and said signal phase node to remove noise from said current sense signal when said at least one phase sensing switch and said at least one power switch change state.

19. The control circuit of claim 17, wherein said current sensor further comprises an on-state resistance of said high-side power switch and said high-side phase sensing switch during a conductive state of said high-side switches, and comprises an on-state resistance of said low-side power switch and said low-side phase sensing switch during a conductive state of said low-side switches.

20. The control circuit of claim 17, wherein said at least one phase sensing switch and said pulse width modulation circuit are included in a common integrated circuit.

* * * * *